United States Patent
Calahan (10) Patent No.: US 7,409,684 B2
(45) Date of Patent: *Aug. 5, 2008

(54) SYSTEM AND METHOD FOR EXTENDING APPLICATION FUNCTIONALITY AND CONTENT

(75) Inventor: Patrick Calahan, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/438,205

(22) Filed: May 22, 2006

(65) Prior Publication Data

US 2006/0212864 A1    Sep. 21, 2006

Related U.S. Application Data

(63) Continuation of application No. 10/421,210, filed on Apr. 23, 2003, now Pat. No. 7,058,940.

(60) Provisional application No. 60/382,670, filed on May 23, 2002.

(51) Int. Cl.
*G06F 9/44* (2006.01)

(52) U.S. Cl. ....................................................... 717/167

(58) Field of Classification Search ......... 717/107–108, 717/136, 176, 167; 709/206, 246, 204, 248, 709/223–224; 707/4, 103 R, 10, 204
See application file for complete search history.

(56) References Cited

U.S. PATENT DOCUMENTS

| | | | |
|---|---|---|---|
| 5,710,922 | A | 1/1998 | Alley et al. |
| 5,761,683 | A | 6/1998 | Logan et al. |
| 6,041,360 | A | 3/2000 | Himmel et al. |
| 6,295,541 | B1 | 9/2001 | Bodnar et al. |
| 6,317,754 | B1 | 11/2001 | Peng |
| 6,341,316 | B1 | 1/2002 | Kloba et al. |
| 2002/0178439 | A1 | 11/2002 | Rich et al. |
| 2003/0028895 | A1 | 2/2003 | Buehler et al. |
| 2003/0050932 | A1* | 3/2003 | Pace et al. .................. 707/100 |
| 2003/0093402 | A1 | 5/2003 | Upton |
| 2003/0101223 | A1 | 5/2003 | Pace et al. |

(Continued)

OTHER PUBLICATIONS

Hesmer et al, "Portlet Development Guide", Apr. 2, 2002, 1st Edition, IBM: Pervasive Computing Development, pp. 1-83.*

(Continued)

*Primary Examiner*—Tuan Anh Vu
(74) *Attorney, Agent, or Firm*—Fliesler Meyer LLP (57) ABSTRACT

A system is disclosed with a method for extending the appearance, functionality and/or the content of an application, such as an administrative console. In accordance with one embodiment, the invention provides a system comprising a first application that includes content which controls the appearance, content, and/or function of said first application, and a second application that includes additional content stored therein, together with an extension or alternate means for adding, and registering said second application with said first application. The content of the second application is then used to modify or extend the appearance, content or functionality of said first application.

15 Claims, 6 Drawing Sheets

U.S. PATENT DOCUMENTS

| | | |
|---|---|---|
| 2003/0115366 A1 | 6/2003 | Robinson |
| 2003/0135509 A1 | 7/2003 | Davis et al. |
| 2003/0154239 A1 | 8/2003 | Davis et al. |
| 2004/0148354 A1 | 7/2004 | Saare et al. |

OTHER PUBLICATIONS

Stien, "Class java.beans.EventSetDescriptor", p. 1-6; <http://web.archive.org/web/20020306204450/http://stein.cshl.org/japd/distrib/docs/java.beans.EventSetDescriptor.html>.

WebLogic(BEA), "Writing a Web Application", Apr. 2001, Developing a Web Application, pp. 1-30. <http://web.archive.org/web/20010405062538/http:www.wblogic.com/docs51/classdocs/webapppguide.html>.

Mahmoud, Q. "Web Application Developing with JASP and XML, Part III: Developing JSP Custom Tags", Aug. 2001 <http://.theserverside.com/articles/articles.tss?1=JSP-XML3>, pp. 1-17.

Paterson, K. "WebSphere Application Server—Programming Model", 2001, IBM@server iSeries.

WebLogic(BEA), "Writing JSP Extensions", BEA Leblogic Server 5.1, Apr. 2001, pp. 1-16, <http://web.archive.org/web/2001411221413/http://www.weblogic.com/docs50/classdocs/API_taglib.html>.

* cited by examiner

SYSTEM AND METHOD FOR EXTENDING APPLICATION FUNCTIONALITY AND CONTENT

CLAIM OF PRIORITY

This application is a continuation of U.S. patent application Ser. No. 10/421,210 filed Apr. 23, 2003, now U.S. Pat. No. 7,058,940 issued Jun. 6, 2006, which claims the benefit of U.S. Provisional Application No. 60/382,670, filed May 23, 2002, both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application functionality, and to a system and method for dynamically extending the functionality and content of an application.

BACKGROUND

The ability to quickly and easily modify a software application is an important requirement in today's e-commerce environment. Since the demands of e-commerce typically requires rapid changes to an application's functionality, and the need to integrate new offerings from third party e-commerce providers, the ability to quickly modify an application to take these needs into account is of paramount importance. For example, a software application that is accessible to a user, and provides to that user some set of business functions, must be flexible enough so that the content or functionality of the application can be changed to reflect changes in the underlying business functions of the organization. At the same time it must be flexible enough to incorporate any changes demanded by, for example, third party vendors or business partners. In the field of Internet commerce the software application is commonly in the form of a web application running on an application or web server, that is accessible over the Internet to a large number of users. Third party Integrated Service Vendors (ISV's) often add functionality to these web applications, that should then be offered to the user on a dynamic basis. The ability to easily integrate these ISV offerings can give the organization a competitive advantage in quickly responding to the needs of the marketplace.

In addition to web applications that are accessible over the Internet, another type of application that would benefit greatly from flexibility in incorporating third party applications, are those administrative applications that are used to organize and administer the resources of an organization. As referred to herein, these resources may include those resources and services offered by other business units within an organization, or by third party vendors, that seek to integrate their application offerings with the enterprise level applications offered by the organization. Typically, an administrative console or application is used to administer these otherwise independent offerings. The ability to modify the administrative console is important in being able to easily administer third party applications, which normally would require their own interface.

While there exists several methods to extend application functionality by incorporating segments or objects from other applications, there is as yet no easy means by which an application can include the content or functionality of another application in a dynamic way that is reflected immediately to both the administrator and user of the application. Furthermore, there is no traditional mechanism by which a third party vendor can extend the functionality of an administrative console or other application by providing an extension with associated content that can be dynamically linked to the administrative console or whose content is incorporated into the administrative console in a dynamic way during run-time processing.

SUMMARY OF THE INVENTION

The invention provides a system and method for extending the functionality and/or the content of an original application, such as an administrative console, with the content provided by a second application, i.e. a third party application or an additional yet otherwise independent application. By providing an easy mechanism by which an administrator can incorporate the content of the second application into the original application, the content or functionality of the original application can be quickly and dynamically modified to address any new requirements, or to quickly change the offerings to a user of the application. In addition, third party vendors can easily incorporate their software offerings, including third party applications, without requiring a detailed knowledge of the interface within the original application. The invention is particularly suited to integrating third party application content and functionality into original applications that are then used to administer enterprise-wide services or resources, for example in one embodiment those resources that are used to administer servers in a web application environment.

In accordance with one embodiment, the invention provides a system that searches for available extensions representing other (i.e. new) application content or third party plug-ins, and then dynamically links the content of an original application to the new content provided by the third party application, or processes the additional or new content in such a way that the content of the original application is modified to reflect the new information. As used herein the term "application content" or "content" is also used to refer to application functionality, such that the overall functionality of an application can be modified using the same means of checking for available extensions and incorporating the associated new functionality into the original application.

DETAILED DESCRIPTION

The invention provides a system and method for extending the functionality and/or the content of an original application, such as an administrative console, with the content provided by a second application, i.e. a third party application or an additional yet otherwise independent application. By providing an easy mechanism by which an administrator can incorporate the content of the second application into the original application, the content or functionality of the original application can be quickly and dynamically modified to address any new requirements, or to quickly change the offerings to a user of the application.

In accordance with one embodiment of the invention, the invention provides a system that searches for available extensions representing other (i.e. new) application content or third party plug-ins, and then dynamically links the content of an original application to the new content provided by the third party application, or processes the additional or new content in such a way that the content of the original application is modified to reflect the new information. As used herein the term "application content" or "content" is also used to refer to application functionality, such that the overall functionality of an application can be modified using the same means of checking for available extensions and incorporating the associated new functionality into the original application.

Figure 1:
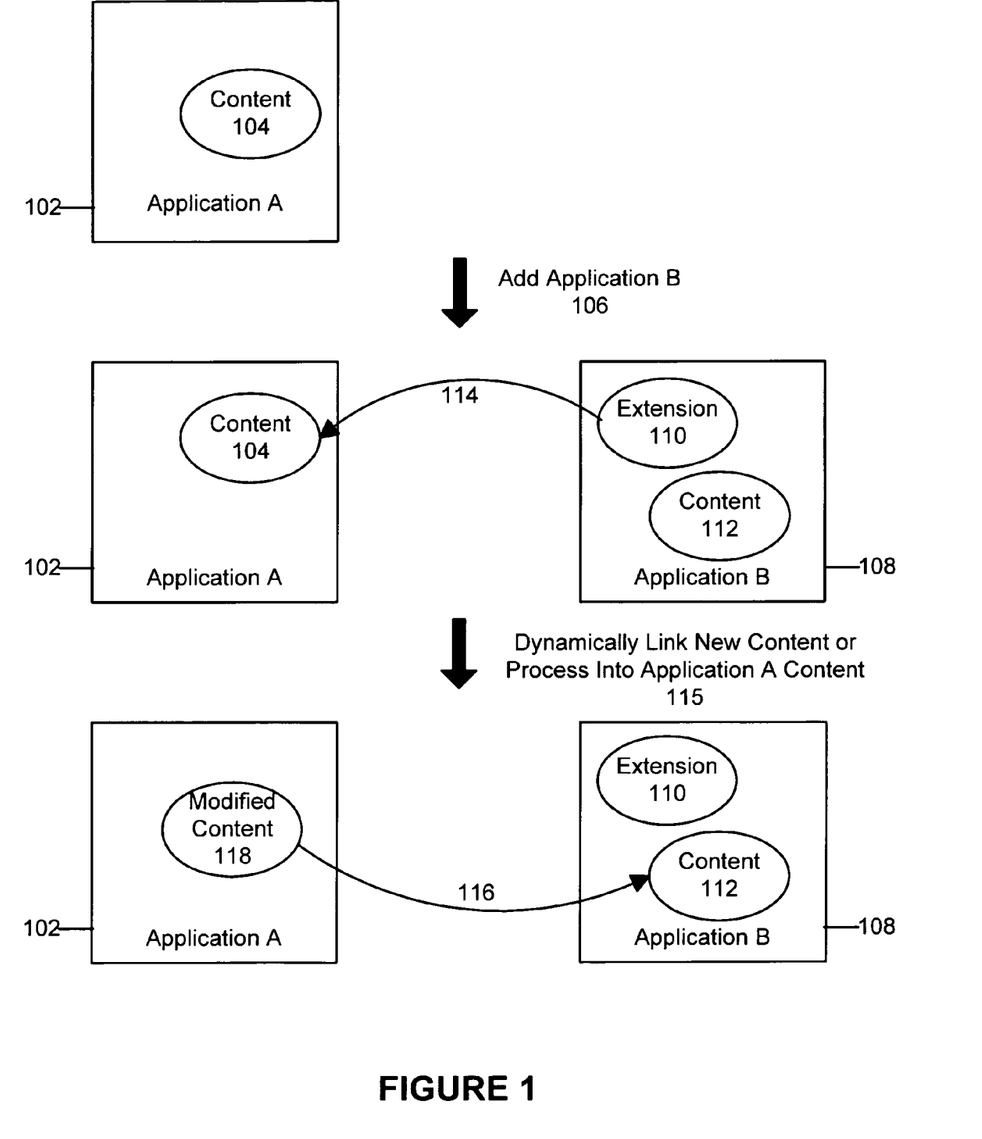
FIG. 1 shows an illustration of how an embodiment of the invention can be used to modify the content of an original application.

FIG. 1 illustrates how one embodiment of the invention can be used to modify the content of an original application A 102. As shown in FIG. 1, the original application A 102 includes an original application content (or simply "content") 104, which determines either the presentation, content, and/or the functionality of the application as it may be used by the user, or by some other process, including for example an automated process. In a typical deployment, the application may be a web page or web server application, i.e. an application executing upon a web server either as a Java Server Page (JSP) or some other form of Java based application. Although it will be evident that the invention is not limited to just Java based applications. The content 104 is used by the application to display application user-readable content, and in some cases to modifying the functionality of the application, i.e. determining how the application will function. In accordance with one embodiment, the application A can be represented as a web application archive (WAR file), although it will be evident that other application types can be used.

When a system administrator or system operator wishes to add a new application B 106, together with any content or functionality included therein, the original application A 102 looks for an extension 110 in the new application by which it can incorporate the new application's content (or simply "new content") 112. In accordance with one embodiment, this extension 110 can be a Java code segment which the original application A 102 searches for, and then uses to dynamically insert 114 content into the original application. As shown in FIG. 1, once the extension 110 has advertised to the application A that it has new content available for integration into the application, this content can be dynamically linked 115 or processed into application A's content to modify the content therein. As a result, in one embodiment application A can now effectively include modified content 118 by linking it directly to the content 112 of the additional application B 108. An alternative embodiment allows for application A to literally include or to incorporate the original content 112 within its modified content 118 during deployment and content processing (for example during JSP processing).

Figure 2:
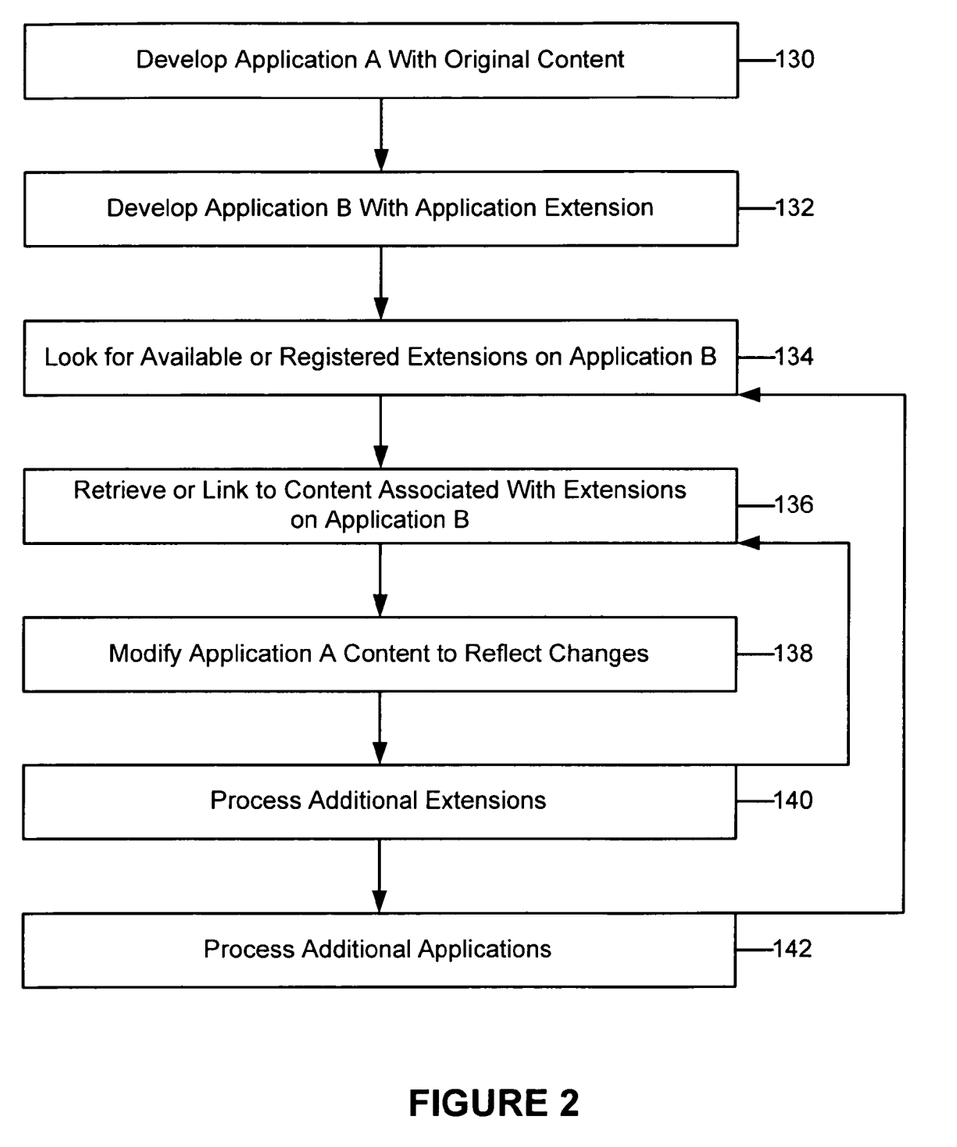
FIG. 2 shows a flowchart of the method used to modify the content or functionality of an application in accordance with an embodiment of the invention.

FIG. 2 illustrates a flowchart showing how the process of incorporating content into an original application is performed in accordance with an embodiment of the invention. As shown in FIG. 2, in step 130 the organization, administrator, or a software developer, develops an application A having an original content, which may include original functionality, typically in the form of Java Server Pages (JSPs), HTML, GIF images, or other forms of data that may be used to modify the operation or content of the application as it is presented to a user. As used herein, the term "user" is used to refer not only to a physical person who may be using the application, but also to another organization, or to another application or process that interacts with the system in order to use the information stored thereon. In step 132, another application developer, which may be for example another business unit within the organization, a third party vendor, or a partner of some sort, develops a second (i.e. "New") application B having an application extension that is understood by the system. In step 134, the original application looks for this extension, and dynamically inserts the content associated with the extension into its original content. Again as used herein, the extension may be associated with any form of content that can be used to modify the operation or the functionality of an application, including for example JSPs, HTML pages, GIF and JPEG images, and other resources and content that can be used by the application. In those instances in which a customer or a third party creates the new application, the functionality provided by the extension may be specific to that customer application needs. During step 134 the customer application, and extension associated therewith advertises to the original application the additional content that should be included in the original application. In step 136, the original application can either link to the content associated with the extension provided by the new application, or can incorporate this content into the original application by content (for example JSP) processing. In step 138, the content of application A is thus modified to reflect the changes associated with the third party application and the content associated therewith. In step 140, additional extensions are processed to retrieve the content associated with those extensions, where available. In step 142, the process returns to process any additional applications that may have been added to the system, either by another business unit, administrator, developer or other third party, including ISVs and third party vendors that need to be integrated into the application.

In some embodiments, the console extension referred to above, may simply be a web application. In order to provide the additional features to the console application it should do the following: provide additional content to be displayed through those links; and, direct the standard or original application to provide navigational paths to the content.

In some environments the application is stored in the form of a Web Application Archive (WAR) file, which contains JSPs and other resources that can be used to expose application specific beans and other functionality. These WAR files are usually served to an end user by means of a browser application that in turn is used to access applications running on a web server. Additionally, some embodiments of the invention may direct the standard application to provide navigational paths to the new content by means of a JSP tag call back mechanism. In accordance with this latter embodiment, some of the original applications tags broadcast notifications as they are processed. Any available extensions may register a listener which can then examine these notifications and optionally provide the tag with the additional content to be displayed or incorporated into the original applications. Some of the various scenarios by which this can be accomplished or utilized are described below.

Figure 3:
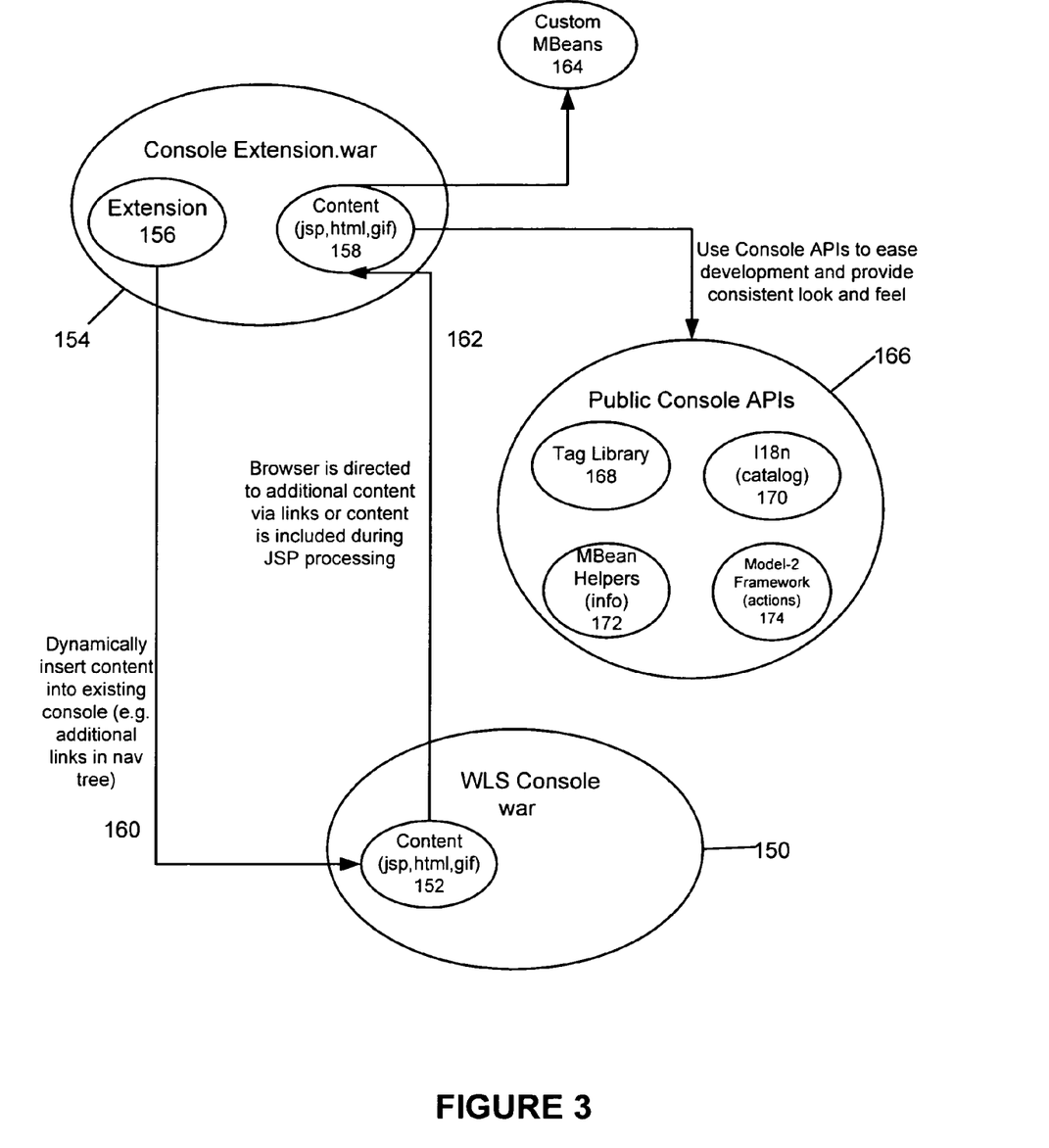
FIG. 3 illustrates a scenario in which an application extension is used to modify the content of an application.

FIG. 3 illustrates one example of a scenario in which, for example, another business unit within an organization, or a business partner, wishes to integrate the functionality of their own product into the content of an existing administrative application. As shown in FIG. 3, the original application in this instance is in the form of a WAR file 150. The WAR file includes content that determines the functionality and the operation of the application, and may include for example a number of JSP, HTML, and GIF files 152 that can be used to modify the content of the War file. Any other entity that wishes to modify the content of the console WAR file 150 can develop a console extension WAR file 154 which includes an extension, or set of extensions, 156, and associated content, again including JSPs, HTMLs, GIFs and JPEGs etc. 158 that will then be used to modify the content on the original WAR. The console extension WAR extension 156 is used to dynamically insert content 160 into the existing console WAR. For example, in one implementation this additional content may provide additional links into the console application's navigation tree. Upon receiving this content insert from the extension 156, the console extension WAR 150 knows to direct the user's application or browser to the additional content 158, either via links 162, or alternatively by including the content into the original WAR during JSP processing. At the same time the console WAR can be used to provide custom managed beans (Mbeans) 164 that are specific to the needs of the extension application. Typically, the system will also include a set of public Application Program Interfaces (APIs) or interfaces 166 that allow business units, partners and independent developers to develop their extension WARs using a standard API notation and syntax. For example, as shown in FIG. 3, the public application API 166 includes interfaces for tag libraries 168, internationalization catalogs 170, Mbean helpers 172, and model framework applications 174, any or all of which can be used by the third party or extension application developer to develop extensions. It will be evident that other types of API can be used with the invention to allow extension applications, (i.e. WARs) to be quickly developed and that can incorporate content easily into the original application WAR.

Figure 4:
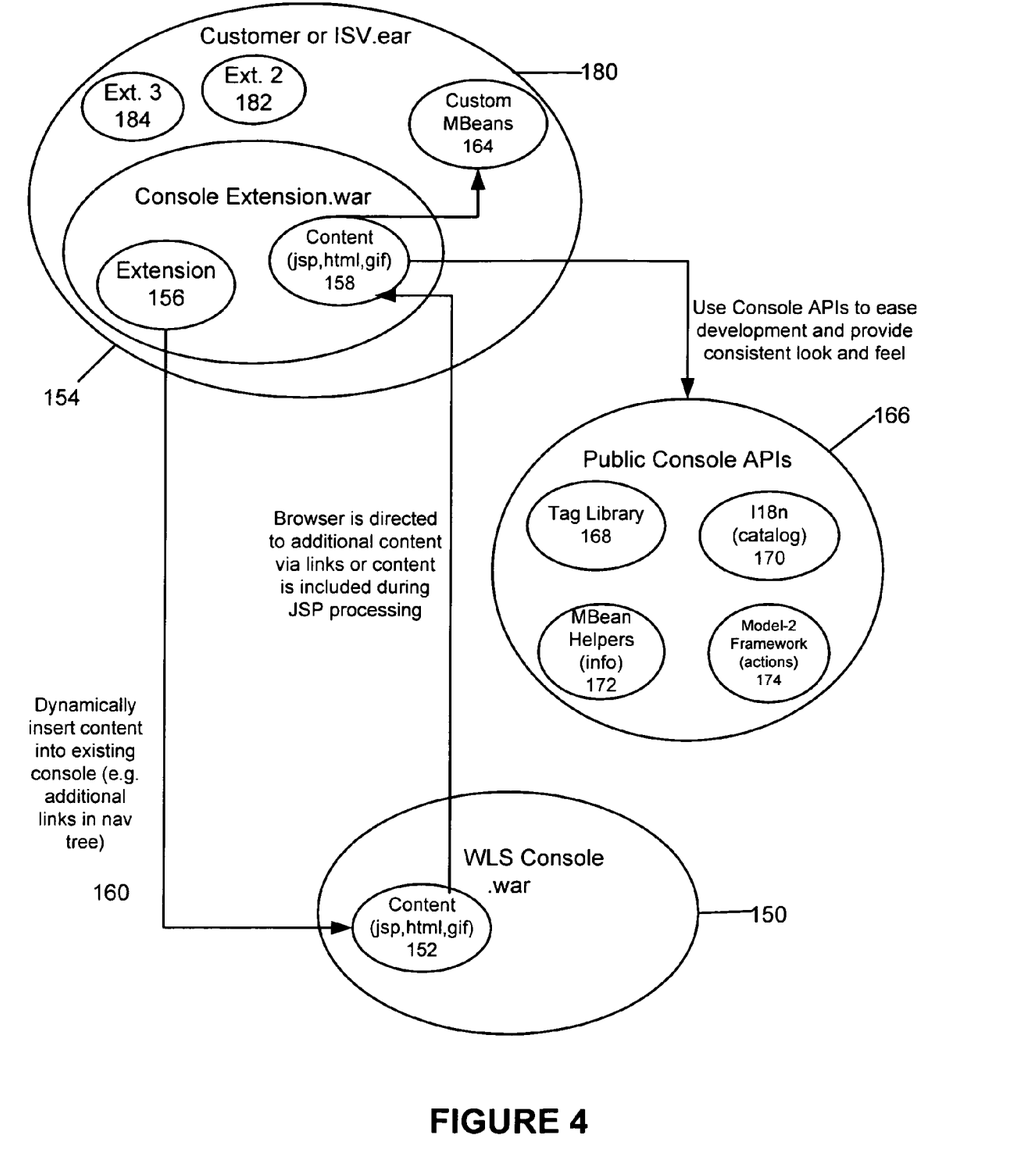
FIG. 4 illustrates an alternate scenario in which a customer application provides additional content and extensions for modifying an original application.

FIG. 4 illustrates an alternate scenario, in which a customer or ISV application developer who has their own custom management content, is able to display third party information, including for example Mbean information, within the context of an original application. In this instance the original application is an administrative console application, although it will be evident that the methods may be equally applied to other types of application. As shown in FIG. 4, the console application WAR is developed as before, including any necessary content. This time however, the customer application is developed in the form of an Enterprise Application Archive (EAR) file, which includes both the console extension WAR and any custom Mbeans 164 that the customer requires for their own independent applications. Additional application extensions 182 and 184 can be added into the EAR file 180, and each extension can come from a separate developer or ISV. In this way the customer or third party developer can quickly develop EAR applications that include a variety of extensions, and that have access to a set of custom Mbeans, wherein the content from each extension can be dynamically added to the content of for example, a console application. As with the previous scenario, the administrative console application has a library support to assist in the development process. Using tags and the tag library to access the console for the purposes of incorporating content allows the customer application to integrate efficiently with the original console application.

Figure 5:
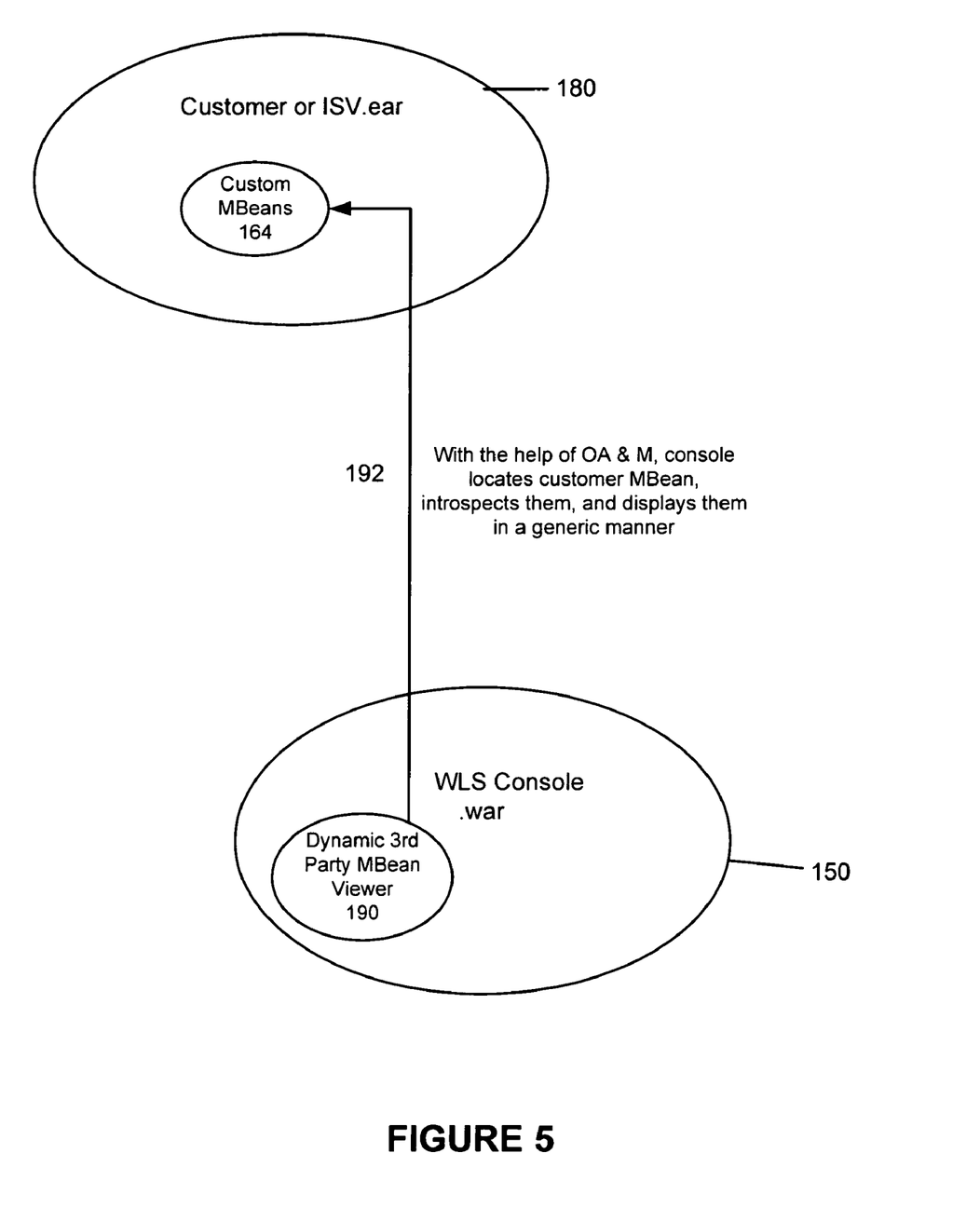
FIG. 5 illustrates an alternate scenario in which a customer application with custom managed beans (Mbeans) is automatically displayed within the context of the original application.

FIG. 5 illustrates an alternate scenario in which a customer or ISV application with custom M beans is automatically displayed with the context of the administrative console application. This scenario makes use of a generic interface, and requires no special work from the custom or third party developer. As shown in FIG. 5, in accordance with this scenario, the console application WAR 150 includes a dynamic third party Mbean viewer 190. The customer or ISV develops their EAR 180 with a set of custom Mbeans 164. At run-time, the console 150 locates 192 the custom Mbeans, introspects them, and displays them in a generic manner.

Figure 6:
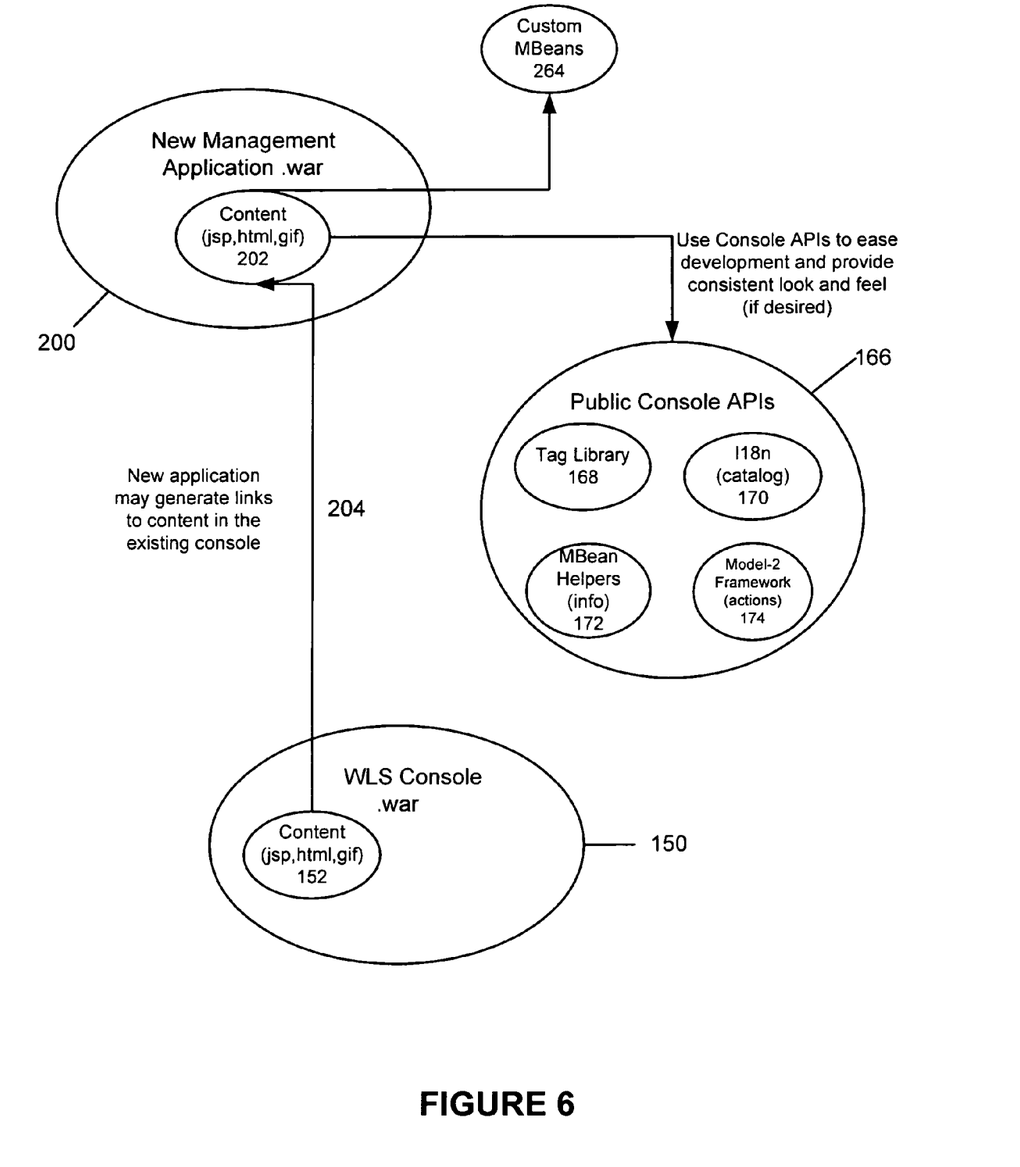
FIG. 6 illustrates an alternate scenario in which the customer application creates a distinct management application, which is then used to borrow pieces of the original application or it's infrastructure.

FIG. 6 illustrates an alternate scenario in which a partner, customer, ISV or other business unit creates a distinct management application that may need to borrow pieces of the console application or it's infrastructure for use within its own application. As shown in FIG. 6, in accordance with this scenario, the console WAR 150 is developed as before, together with any necessary content or functionality 152. The new application WAR 200 including the necessary content in that application 202, can generate links 204 to the content in the existing console application. This information can then be used to effect the functioning of the new applications custom M beans 164.

Although the various scenarios described above illustrate how the invention can be used to dynamically incorporate content into an original application using extensions and associated content, or to read information from existing applications such that the content in those applications can be used to modify or to effect the operation of custom Mbeans, it will be evident to one skilled in the art that the invention is not limited to the various scenarios described above, but can be used in a variety of alternate scenarios in which the organization, or a developer or administrator wishes to dynamically alter the content of functionality of one (first) application based upon the content, functionality, or features of another (second) application.

IMPLEMENTATION EXAMPLE

The implementation described in detail below illustrates how one embodiment of the invention can be implemented in the form of Java packages and interfaces, particularly in the context of a Web browser application that uses JSP's for content, and provides access to third party Mbeans. It will be evident that the invention is not limited to the implementation described below for purposes of illustration.

Package weblogic.management.console.extensibility

This package supports the deployment of console extensions which augment the functionality of a standard Administrative Console, such as the WebLogic Console provided in BEA's WebLogic application server product.

Interface Summary

Catalog Interface to a read-only set of named text entries.

Extensible Tag Interface implemented by console tags which are available for extension.

Class Summary

Catalog.Factory Use this class to retrieve instances of Catalog which are correctly localized for the given page context.

Extension An abstract base class to be implemented by extension authors.

In accordance with one embodiment, a console extension is simply a web application. As described above, in order to provide features in the console, it must do both of the following:

Provide additional content to be displayed through those links; and,

Direct the standard console to provide navigational paths to that content.

Achieving first goal is pretty straightforward: typically, the extension .war will contain JSPs and other resources which expose application-specific MBeans or other sorts of new functionality. These pages are usually served to the end-users browser directly from the extension webapp.

The second goal is accomplished by means of a jsp tag call back mechanism. Some of the console's tags broadcast notifications as they are processed. Extensions may register a listener which can examine these notifications and opt to provide the tag with additional content to be displayed.

Tag Libraries

Extension authors are encouraged to utilize the console's library of tags when composing new pages to be displayed in the console. This reduces development time while promoting a consistent look-and-feel in the interface. In order to use the custom tags, the extension war file must include the tag library descriptor appended to the bottom of this document. This includes detailed documentation about the tags and tag attributes that are currently supported for console extensions.

Deployment

A console extension is deployed like any other web application, but to be recognized as a console extension, its descriptor (web.xml) must include a context param which specifies the Extension that should be instantiated when the extension is deployed. The name of the parameter is weblogic.console.extension.class and the value is simply the fully-specified name of a class which extends Extension, for example as shown below:

```
<context-param>
    <param-name>
        weblogic.console.extension.class
    </param-name>
    <param-value>
        com.mycompany.MyWebLogicConsoleExtension
    </param-value>
</context-param>
```

This Extension's class file should be packaged in the extension .war like any other class. Once the extension web application has been deployed and it's Extension class successfully instantiated, the extension will be able to modify the console's behavior. In accordance with one embodiment, the hierarchy for the package weblogic.management.console.extensibility appears as shown below:

Class Hierarchy
class java.lang.Object
    class weblogic.management.console.extensibility.Catalog.Factory
    class weblogic.management.console.extensibility.internal.ExtensionInternals
        class weblogic.management.console.extensibility.Extension Interface Hierarchy
    interface weblogic.management.console.extensibility.Catalog
    interface weblogic.management.console.extensibility.Extensible Tag weblogic.management.console.extensibility—Interface Catalog Public Interface Catalog
This interface is to a read-only set of named text entries.

Static Class Catalog.Factory
This class is used to retrieve instances of Catalog which are correctly localized for the given page context.

weblogic.management.console.extensibility—Interface Extensible Tag

Public Interface Extensible Tag
This interface is implemented by console tags which are available for extension. This class is not implemented by extension authors; rather, it is implemented by WLS console tag handlers which make themselves available for extension. Tag handlers which implement this interface assume responsibility for notifying the ExtensionRegistry at the beginning of their doStartTag( ) implementation.

weblogic.management.console.extensibility—Class Catalog.Factory java.lang.Object
 |
 +--weblogic.management.console.extensibility.Catalog.Factory Public Static Class Catalog.Factory Extends java.lang.Object
This class is used to retrieve instances of Catalog which are correctly localized for the given page context. For example, Catalog myCatalog=Catalog.Factory. getCatalog(pageContext)./p> weblogic.management.console.extensibility—Class Extension java.lang.Object
 |
 +--weblogic.management.console.extensibility.internal.ExtensionInternals
 |
 +--weblogic.management.console.extensibility.Extension Public Abstract Class Extension Extends ExtensionInternals
This is an abstract base class to be implemented by extension authors. Implementations of this class must be referenced in the configuration file (eg the web.xml descriptor) for the extension web app like this:

```
<context-param>
    <param-name>
```

-continued

```
        weblogic.console.extension.class
    </param-name>
    <param-value>
        com.mycompany.MyWebLogicConsoleExtension
    </param-value>
</context-param>
```

When the web app is deployed, an instance of the named Extension class is created and its initialize( ) method is called. At this point, the Extensible TagListener provided by the Extension will begin to receive callbacks from the console's JSP tag handlers.

java.lang.String getDescription(javax.servlet.jsp.PageContext context)

Returns additional description information to be displayed in the console for managing this extension. The PageContext parameter may be used to localize the description. Implementation of this method is optional.

java.lang.String getExtensionContentFor(Extensible Tag tag)

Called just before the specified tag begins to process its doStart Tag( ) method. Typically, the implementing method will inspect the ExtensibleTag's Type and ExtensibilityKey and then decide whether or not it wishes to have additional content included within the tag. This method may return a value to indicate additional child contents for the tag. The value must be a path relative to the root of the extension webapp and should usually be a JSP. The exact semantics of 'additional child content' will vary from tag to tag. In the case of a NavNode, the url should reference a jsp which contains <wl:node> which will be inserted as additional child nodes. In the case of a Dialog, the referenced page should contain a <wl:dialog> that will be treated as an additional sub tab. This method should return null if the extension has no content to add to the given tag.

java.lang.String getExtensionVersion( )

Returns a string describing the version of this extension. Returns a string describing the version of this extension. Implementation of this method is optional. This value is only used for display purposes.

java.lang.String getIcon( )

Returns the url to an .gif or .jpg that to be displayed in the console to represent this extension. The url is relative to the extension web app's root. The expected size for the image is 16×16 pixels; it will be scaled to fit if necessary. Implementation of this method is optional.

java.lang.String getName(javax.servlet.jsp. PageContext Context)

Returns the name to be displayed in the console for managing this extension. The PageContext parameter may be used to localize the display name. Implementation of this method is optional. If omitted, the name displayed names is based on the extension's web application name.

java.lang.String getWeblogicServerVersion( )

Returns the version of the weblogic server against which this extension was built. This value should be a string of the form x.y.z, e.g., 7.0.0. Implementation of this method is optional but highly recommended. The extensibility mechanism will be backward compatible, but not necessarily forward compatible. The console will use the version string to warn the user if they are installing an extension built for a later server version than the one they are running. To find out exactly what version of the server you have, simply java weblogic.version.

Void Initialize( )

Called by the Extension container exactly once after a new instance of the extension has been created and registered. This method is guaranteed to be called before any other methods are invoked on this Extension.

TLD for Console Extension Custom Tags

```
<?xml version="1.0" encoding="ISO-8859-1" ?>
<!DOCTYPE taglib
    PUBLIC "-//Sun Microsystems, Inc.//DTD JSP Tag Library 1.1//EN"
    "http://java.sun.com/j2ee/dtds/web-jsptaglibrary_1_1.dtd">
<taglib>
    <tlibversion>6.1.0</tlibversion>
    <jspversion>1.1</jspversion>
    <shortname>Console Extension Tags</shortname>
    <info>
        Tags for use by WebLogic Console Extensions.
    </info>
<!--
extensibility-key
-->
    <tag>
        <name>extensibility-key</name>
        <tagclass>weblogic.management.console.tags.ExtensibilityKeyTag</tagclass>
        <bodycontent>empty</bodycontent>
        <info>
            This tag can be used to produce a scripting variable to allow a JSP to
get a hold of the ExtensibilityKey object returned by ExtensibleTag.
            id       - Name of JSP scripting variable to assign to the key object.
            class    - Name of Class that the scripting variable should be declared
as.
        </info>
        <attribute>
            <name>id</name>
            <required>true</required>
            <rtexprvalue>false</rtexprvalue>
        </attribute>
```

-continued

```
      <attribute>
         <name>label</name>
         <required>true</required>
         <rtexprvalue>false</rtexprvalue>
      </attribute>
   </tag>
$lt;!--
   stylesheet
--&rt;
   $lt;tag&rt;
      $lt;name&rt;stylesheet$lt;/name&rt;
$lt;tagclass&rt;weblogic.management.console.tags.StylesheetIncludeTag$lt;/tagclass&rt;
      $lt;bodycontent&rt;empty$lt;/bodycontent&rt;
      $lt;info&rt;
         This tag should be declared in the head section of pages which wish
         to share the console's stylesheet. This is required if you are using
         the dialog tag.
         The Stylesheet tag has no attributes.
      $lt;/info&rt;
   $lt;/tag&rt;
<!--
   node
-->
   <tag>
      <name>node</name>
      <tagclass>weblogic.management.console.tags.NavNodeTag</tagclass>
      <bodycontent>JSP</bodycontent>
      <info>
         This tag should be used only in pages which generate navigation trees;
         each node tag corresponds to a node in the tree. Node tags may be nested
         to form correspondingly nested nodes in the tree.
         The Node tag recognizes the following attributes:
            icon         - URL to an image (.gif or .jpg) that should be
                           displayed for the node. The URL may be absolute
                           (http://...) or relative to the extension webapp root
                           (/images/blob.gif).
            label        - Exact text to appear next to the node icon in the
                           tree.
            labelId      - Catalog ID of localized text to appear in the tree.
            url          - Absolute or relative URL that should be displayed in
                           the browser when the user clicks the node.
            target       - Name of browser frame in which the contents of the
                           node's URL should be displayed. Special javascript
                           keywords __top and __blank are supported.
            expanded     - If 'true', the node is initially expanded, i.e. all
                           of its immediate children will also be visible.
                           Default is false.
            font         - Font to be used for the node text. This value is
                           passed directly to java.awt.Graphics.setFont() when
                           rendering the tree; support for particular fonts and
                           styles will be browser-dependent.
      </info>
      <attribute>
         <name>icon</name>
         <required>false</required>
         <rtexprvalue>true</rtexprvalue>
      </attribute>
      <attribute>
         <name>label</name>
         <required>false</required>
         <rtexprvalue>true</rtexprvalue>
      </attribute>
      <attribute>
         <name>labelId</name>
         <required>false</required>
         <rtexprvalue>true</rtexprvalue>
      </attribute>
      <attribute>
         <name>url</name>
         <required>false</required>
         <rtexprvalue>true</rtexprvalue>
      </attribute>
      <attribute>
         <name>target</name>
         <required>false</required>
         <rtexprvalue>true</rtexprvalue>
      </attribute>
      <attribute>
         <name>font</name>
```

-continued

```
            <required>false</required>
            <rtexprvalue>true</rtexprvalue>
        </attribute>
    </tag>
<!--
    menu
-->
    <tag>
        <name>menu</name>
        <tagclass>weblogic.management.console.tags.NavPopupTag</tagclass>
        <bodycontent>JSP</bodycontent>
        <info>
            This tag should be used only in pages which generate navigation
            trees.  When nested within a Node tag, the Menu tag specifies an item
            in the popup menu that appears when the user right-clicks on the
            node.  A node tag may contain an arbitrary number of menu and
            menu-separator tags; the menu items appear in the same order as the
            corresponding tags.
            The Menu tag recognizes the following attributes:
                label       - Exact text to appear in the menu item.
                labelId     - Catalog ID of localized text to appear in the menu
                              item. Specify label or labelId but not both.
                url         - Absolute or relative URL that should be displayed in
                              the browser when the user selects the menu item.
                target      - Name of browser frame in which the contents of the
                              menu item's URL should be displayed. Special
                              javascript keywords _top and _blank are supported.
        </info>
        <attribute>
            <name>label</name>
            <required>false</required>
            <rtexprvalue>true</rtexprvalue>
        </attribute>
        <attribute>
            <name>labelId</name>
            <required>false</required>
            <rtexprvalue>true</rtexprvalue>
        </attribute>
        <attribute>
            <name>url</name>
            <required>false</required>
            <rtexprvalue>true</rtexprvalue>
        </attribute>
        <attribute>
            <name>target</name>
            <required>false</required>
            <rtexprvalue>true</rtexprvalue>
        </attribute>
    </tag>
<!--
    menu-separator
-->
    <tag>
        <name>menu-separator</name>
        <tagclass>weblogic.management.console.tags.NavMenuSeparatorTag</tagclass>
        <bodycontent>empty</bodycontent>
        <info>
            This tag should be used only in pages which generate navigation trees.
            When nested within a Node tag, the Menu tag specifies a separator line
            to appear in the popup menu that appears when the user right-clicks on
            the node. This can be useful for presenting menu items in logical
groups.
            The Menu-Separator tag has no attributes.
        </info>
    </tag>
<!--
    dialog
-->
    <tag>
        <name>dialog</name>
        <tagclass>weblogic.management.console.tags.DialogTag</tagclass>
        <bodycontent>JSP</bodycontent>
        <info>
            This tag is used to demarcate a section of an HTML tabbed-dialog.
            The Dialog tag accepts no attributes.
        </info>
    </tag>
<!--
    tab
```

-continued

```
-->
  <tag>
    <name>tab</name>
    <tagclass>weblogic.management.console.tags.DialogTag</tagclass>
    <bodycontent>JSP</bodycontent>
    <info>
      Tab tags represent a single tab on a tabbed dialog. A tab may
      contain arbitrary JSP content or other Tab tags, but not both.
      In the latter case, the nested Tab tags will appear as subtabs
      in the output. Currently, only one level of nesting is supported,
      i.e. tabs and sub-tabs.
      The Menu tag recognizes the following attributes:
        name        - A name for the tab. Names may not contain the period
                      (.)character.
        label       - The exact text to appear on the tab.
        labelId     - Catalog ID of localized text to appear on the tab.
                      Specify label or labelId but not both.
    </info>
    <attribute>
      <name>name</name>
      <required>true</required>
      <rtexprvalue>true</rtexprvalue>
    </attribute>
    <attribute>
      <name>label</name>
      <required>false</required>
      <rtexprvalue>true</rtexprvalue>
    </attribute>
    <attribute>
      <name>labelId</name>
      <required>false</required>
      <rtexprvalue>true</rtexprvalue>
    </attribute>
  </tag>
<!--
  text
-->
  <tag>
    <name>text</name>
    <tagclass>weblogic.management.console.tags.TextTag</tagclass>
    <bodycontent>empty</bodycontent>
    <info>
      Convenience tag for outputting text from the localization catalog.
      The Text tag recognizes the following attributes:
        style       - HTML style class for the text; if specified, the text
                      output is enclosed in a <span> tag with class equal to
                      this value.
        text        - Literal text to be displayed.
        textId      - Catalog id of text to be displayed. Specify text or
                      textId but not both.
        textParam   - Listeral text to be substituted for any occurrence of
                      '{0}'in the catalog text specified by textId.
        textParamId - Catalog id of text to be substituted for any occurrence
                      of '{0}' in the catalog text specified by the textId.
    </info>
    <attribute>
      <name>style</name>
      <required>false</required>
      <rtexprvalue>true</rtexprvalue>
    </attribute>
    <attribute>
      <name>text</name>
      <required>false</required>
      <rtexprvalue>true</rtexprvalue>
    </attribute>
    <attribute>
      <name>textId</name>
      <required>false</required>
      <rtexprvalue>true</rtexprvalue>
    </attribute>
    <attribute>
      <name>textParam</name>
      <required>false</required>
      <rtexprvalue>true</rtexprvalue>
    </attribute>
    <attribute>
      <name>textParamId</name>
      <required>false</required>
      <rtexprvalue>true</rtexprvalue>
```

```
    </attribute>
  </tag>
</taglib>
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers may use and benefit from the invention. The code example given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a computer for extending application content comprising a computer, and:
   a first application executing on the computer that includes an application content, and also includes a plurality of extensible tags that specify where additional content can be incorporated, wherein the first application uses tag handlers to process the plurality of extensible tags and to broadcast notifications of extensible tags as the extensible tags are being processed;
   a second application executing on the computer that includes additional content, and also includes a tag extension that extends at least one of the extensible tags of the first application, wherein the tag extension advertises the additional content as being available for use by the first application;
   a listener implemented on the second application that is to provide additional content, wherein the listener is registered to receive the notifications from the tag handlers when the first application is executed;
   wherein the second application uses the listener to optionally provide additional content for use by the first application based on the notification; and
   wherein the first application upon receiving the advertising, searches for available tag extensions in the second application, and upon finding an available tag extension, the first application uses the additional application content associated with the tag extension of the second application to extend the extensible tag of the first application at the location where the notification was initiated.

2. The system of claim 1 wherein said advertising causes said first application to incorporate the additional application content of said second application with the application content of said first application.

3. The system of claim 1 wherein said advertising causes said first application to link the application content of said first application to the additional application content provided by said second application.

4. The system of claim 1 wherein
   said second application is one of a plurality of applications executing on the computer that each includes additional content and a tag extension, and wherein
   said listener is one of a plurality of listeners implemented on the plurality of applications and each listener is registered to receive the notification from the tag handlers when the first application is executed, and wherein
   each application uses its listener to optionally provide its additional content for use by the first application based on the notification, to the location where the notification was initiated.

5. The system of claim 1 wherein said first application is a web archive file and said second application is en enterprise archive file, wherein the web archive file and the enterprise archive file are separate archive files.

6. A method for extending application content comprising the steps of:
   executing a first application on a computer, wherein the first application includes an application content, and also includes a plurality of extensible tags that specify where additional content can be incorporated, wherein the first application uses tag handlers to process the plurality of extensible tags and to broadcast notifications of the extensible tags as the extensible tags are being processed;
   executing a second application on the computer, wherein the second application includes additional content, and also includes a tag extension that extends at least one of the extensible tags of the first application, wherein the tag extension advertises the additional content as being available for use by the first application;
   implementing a listener on the second application that is to provide additional content, wherein the listener is registered to receive the notifications from the tag handlers when the first application is executed;
   wherein the second application uses the listener to optionally provide additional content for use by the first application based on the notification; and wherein the first application upon receiving the advertising, searches for available tag extensions in the second application, and upon finding an available tag extension, the first application uses the additional application content associated with the tag extension of the second application to extend the extensible tag of the first application at the location where the notification was initiated.

7. The method of claim 6 wherein said advertising causes said first application to incorporate the additional application content of said second application with the application content of said first application.

8. The method of claim 6 wherein said advertising causes said first application to link the application content of said first application to the additional application content provided by said second application.

9. The method of claim 6 wherein
said second application is one of a plurality of applications executing on the computer that each includes additional content and a tag extension, and wherein
said listener is one of a plurality of listeners implemented on the plurality of applications and each listener is registered to receive the notification from the tag handlers when the first application is executed, and wherein
each application uses its listener to optionally provide its additional content for use by the first application based an the notification, to the location where the notification was initiated.

10. The method of claim 6 wherein said first application is a web archive file and said second application is an enterprise archive file, wherein the web archive file and the enterprise archive file are separate archive files.

11. A computer readable storage medium including instructions stored thereon, which when executed cause a computer to perform the steps of:
executing a first application on the computer, wherein the first application includes an application content, and also includes a plurality of extensible tags that specify where additional content can be incorporated, wherein the first application uses tag handlers to process the plurality of extensible tags and to broadcast notifications of the extensible tags as the extensible tags are being processed;
executing a second application on the computer, wherein the second application includes additional content, and also includes a tag extension that extends at least one of the extensible tags of the first application, wherein the tag extension advertises the additional content as being available for use by the first application;
implementing a listener on the second application that is to provide additional content, wherein the listener is registered to receive the notifications from the tag handlers when the first application is executed;
wherein the second application uses the listener to optionally provide additional content for use by the first application based on the notification; and
wherein the first application upon receiving the advertising, searches for available tag extensions in the second application, and upon finding an available tag extension, the first application uses the additional application content associated with the tag extension of the second application to extend the extensible tag of the first application at the location where the notification was initiated.

12. The computer readable storage medium of claim 11 wherein said advertising causes said first application to incorporate the additional application content of said second application with the application content of said first application.

13. The computer readable storage medium of claim 11 wherein said advertising causes said first application to link the application content of said first application to the additional application content provided by said second application.

14. The computer readable storage medium of claim 11 wherein
said second application is one of a plurality of applications executing on the computer that each includes additional content and a tag extension, and wherein
said listener is one of a plurality of listeners implemented on the plurality of applications and each listener is registered to receive the notification from the tag handlers when the first application is executed, and wherein
each application uses its listener to optionally provide its additional content for use by the first application based on the notification, to the location where the notification was initiated.

15. The computer readable storage medium of claim 11 wherein said first application is a web archive file and said second application is an enterprise archive file, wherein the web archive file and the enterprise archive file are separate archive files.

\* \* \* \* \*

UNITED STATES PATENT AND TRADEMARK OFFICE
CERTIFICATE OF CORRECTION

| | | |
|---|---|---|
| PATENT NO. | : 7,409,684 B2 | Page 1 of 1 |
| APPLICATION NO. | : 11/438205 | |
| DATED | : August 5, 2008 | |
| INVENTOR(S) | : Calahan | |

It is certified that error appears in the above-identified patent and that said Letters Patent is hereby corrected as shown below:

On the Title Pg, on page 2, Item (56), under "Other Publications", line 4, delete "webapppguide" and insert -- webappguide --, therefor.

On the Title Pg, on page 2, Item (56), under "Other Publications", line 10, delete "Leblogic" and insert -- Weblogic --, therefor.

On sheet 3 of 6, in Figure 3, box no. 150, line 2, delete "war" and insert -- .war --, therefor.

In column 5, line 18, delete "War" and insert -- WAR --, therefor.

In column 6, line 66, delete "Extensible Tag" and insert -- ExtensibleTag --, therefor.

In column 7, line 55, delete "class" and insert -- .class --, therefor.

In column 8, line 7, delete "Extensible Tag" and insert -- ExtensibleTag --, therefor.

In column 8, line 19, delete "Extensible Tag" and insert -- ExtensibleTag --, therefor.

In column 8, line 20, delete "Extensible Tag" and insert -- ExtensibleTag --, therefor.

In column 8, line 60, delete "(eg" and insert -- (e.g. --, therefor.

In column 9, line 25, delete "doStart Tag( )" and insert -- doStartTag( ) --, therefor.

In column 18, line 41, in claim 5, delete "en" and insert -- an --, therefor.

In column 19, line 27, in claim 9, delete "an" and insert -- on --, therefor.

Signed and Sealed this

Sixteenth Day of March, 2010

David J. Kappos
*Director of the United States Patent and Trademark Office*